(12) United States Patent
Kitagawa et al.

(10) Patent No.: US 8,975,806 B2
(45) Date of Patent: Mar. 10, 2015

(54) BULB-TYPE LAMP

(75) Inventors: Toshitake Kitagawa, Kanagawa (JP); Makoto Sakai, Kanagawa (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 7 days.

(21) Appl. No.: 13/818,571

(22) PCT Filed: Aug. 29, 2011

(86) PCT No.: PCT/JP2011/069441
§ 371 (c)(1),
(2), (4) Date: May 6, 2013

(87) PCT Pub. No.: WO2012/029711
PCT Pub. Date: Mar. 8, 2012

(65) Prior Publication Data
US 2013/0221829 A1    Aug. 29, 2013

(30) Foreign Application Priority Data

Aug. 31, 2010  (JP) .................................. 2010-194975
Aug. 31, 2010  (JP) .................................. 2010-194976
Aug. 31, 2010  (JP) .................................. 2010-194977
Aug. 24, 2011  (JP) .................................. 2011-182975

(51) Int. Cl.
*H01J 5/16*       (2006.01)
*H01J 61/40*      (2006.01)
*H01K 1/26*       (2006.01)
(Continued)

(52) U.S. Cl.
CPC ................ *G02B 3/00* (2013.01); *F21K 9/1355* (2013.01); *F21K 9/50* (2013.01); *F21V 5/008* (2013.01); *F21V 5/04* (2013.01); *F21V 7/0091* (2013.01);
(Continued)

(58) Field of Classification Search
USPC ............ 313/498, 110, 46, 116, 111; 362/327, 362/329, 308, 311.02, 311.09, 332, 335
See application file for complete search history.

(56) References Cited

U.S. PATENT DOCUMENTS 3,596,136 A  *  7/1971  Fischer ......................... 257/794
5,164,573 A  * 11/1992  Ishikawa ....................... 235/454
(Continued)

FOREIGN PATENT DOCUMENTS

JP         3159084 B2      4/2001
JP         2005-108700     4/2005
(Continued)

OTHER PUBLICATIONS

PCT Search Report dated Nov. 15, 2011, filed in PCT counterpart Application No. PCT/JP2011/069441, 2 pages.
(Continued)

*Primary Examiner* — Thomas A Hollweg
(74) *Attorney, Agent, or Firm* — Patterson & Sheridan LLP

(57) ABSTRACT

A lens includes a first lens section and a second lens section, which are integrally formed. The first lens section is formed in a hemispherical shell shape including a first recess opened toward one side of an optical axis direction in which light from a light source is made incident. The second lens section is formed in a hemispherical shell shape including a second recess opened toward the other side of the optical axis direction.

8 Claims, 8 Drawing Sheets

(51) Int. Cl.

| | |
|---|---|
| *H01K 1/30* | (2006.01) |
| *G02B 3/00* | (2006.01) |
| *F21K 99/00* | (2010.01) |
| *F21V 5/00* | (2006.01) |
| *F21V 5/04* | (2006.01) |
| *F21V 7/00* | (2006.01) |
| *F21V 19/00* | (2006.01) |
| *F21V 3/02* | (2006.01) |
| *F21Y 101/02* | (2006.01) |
| *F21V 13/02* | (2006.01) |

(52) U.S. Cl.
CPC ............... *F21V 19/0055* (2013.01); *F21V 3/02* (2013.01); *F21Y 2101/02* (2013.01); *F21V 13/02* (2013.01)
USPC ........... 313/110; 313/111; 313/116; 313/498; 313/46; 362/308; 362/311.02; 362/311.09; 362/327; 362/329; 362/332; 362/335

(56) References Cited

U.S. PATENT DOCUMENTS

| | | | | |
|---|---|---|---|---|
| 5,175,783 | A * | 12/1992 | Tatoh | 385/93 |
| 5,594,433 | A * | 1/1997 | Terlep | 340/908.1 |
| 5,865,529 | A * | 2/1999 | Yan | 362/327 |
| 6,803,607 | B1 | 10/2004 | Chan et al. | |
| 7,454,119 | B2 * | 11/2008 | Hsieh et al. | 385/146 |
| 7,458,703 | B2 * | 12/2008 | Han et al. | 362/267 |
| 7,524,098 | B2 * | 4/2009 | Vennetier et al. | 362/555 |
| 7,572,036 | B2 * | 8/2009 | Yoon et al. | 362/331 |
| 7,602,559 | B2 * | 10/2009 | Jang et al. | 359/726 |
| 8,029,157 | B2 * | 10/2011 | Li et al. | 362/249.02 |
| 8,297,799 | B2 * | 10/2012 | Chou | 362/311.02 |
| 8,382,337 | B2 * | 2/2013 | Ing et al. | 362/311.03 |
| 8,426,871 | B2 * | 4/2013 | Rapoport et al. | 257/79 |
| 2005/0243570 | A1 * | 11/2005 | Chaves et al. | 362/551 |
| 2006/0193137 | A1 * | 8/2006 | Chinniah et al. | 362/326 |
| 2007/0019416 | A1 * | 1/2007 | Han et al. | 362/307 |
| 2008/0089062 | A1 | 4/2008 | Vennetier et al. | |
| 2008/0123351 | A1 * | 5/2008 | Olsson | 362/335 |
| 2009/0067179 | A1 * | 3/2009 | Chaves et al. | 362/329 |
| 2009/0161360 | A1 * | 6/2009 | Li et al. | 362/235 |
| 2009/0195186 | A1 * | 8/2009 | Guest et al. | 315/294 |
| 2009/0296387 | A1 * | 12/2009 | Reisenauer et al. | 362/235 |
| 2009/0303731 | A1 | 12/2009 | Chang | |
| 2010/0073937 | A1 * | 3/2010 | Ho | 362/335 |
| 2010/0096992 | A1 * | 4/2010 | Yamamoto et al. | 315/112 |
| 2010/0118531 | A1 * | 5/2010 | Montagne | 362/235 |
| 2010/0195335 | A1 * | 8/2010 | Allen et al. | 362/309 |
| 2010/0327302 | A1 * | 12/2010 | Wang et al. | 257/98 |
| 2011/0032325 | A1 * | 2/2011 | Harris | 348/36 |
| 2011/0069496 | A1 * | 3/2011 | Ing et al. | 362/311.02 |
| 2011/0110093 | A1 * | 5/2011 | Hsu | 362/277 |
| 2011/0148270 | A1 * | 6/2011 | Bhairi | 313/46 |
| 2011/0170299 | A1 * | 7/2011 | Takase et al. | 362/308 |
| 2011/0270585 | A1 * | 11/2011 | Chen et al. | 703/1 |
| 2012/0140486 | A1 * | 6/2012 | Chou | 362/311.02 |
| 2012/0169204 | A1 * | 7/2012 | Wu et al. | 313/116 |
| 2012/0235553 | A1 * | 9/2012 | Bhairi | 313/46 |

FOREIGN PATENT DOCUMENTS

| | | |
|---|---|---|
| JP | 2006-092983 | 4/2006 |
| JP | 2010-146952 A | 7/2010 |
| JP | 2011-142060 | 7/2011 |

OTHER PUBLICATIONS

Korean Office Action dated Jan. 17, 2014 for Application No. 10-2013-7002537.
Supplementary European Search Report dated Jan. 20, 2014 for Application No. EP 11 82 1727.

* cited by examiner

US 8,975,806 B2

BULB-TYPE LAMP

CROSS REFERENCE TO RELATED APPLICATION

This application is based upon and claims the benefit of priority from PCT/JP2011/069441, filed on Aug. 29, 2011, which is based upon and claims the benefit of priority from the prior Japanese Application No. 2010-194977, filed on Aug. 31, 2010; Japanese Application No. 2010-194976, filed on Aug. 31, 2010; Japanese Application No. 2010-194975, filed on Aug. 31, 2010 and Japanese Application No. 2011-182975, filed on Aug. 24, 2011. The entire contents of which are incorporated herein by reference.

TECHNICAL FIELD

Embodiments of the present invention relate to a lens for controlling light from a light source, a lighting device and a bulb-type lamp in each of which the lens is used, and a luminaire in which the bulb-type lamp is used.

BACKGROUND ART

There is a bulb-type lamp that can replace an incandescent lamp and in which an LED element is used as a light source. In the bulb-type lamp, a substrate on which the LED element is mounted and the light source is formed is attached to one end face of a base body and a globe that covers the light source is attached to one end of the base body.

In general, the incandescent lamp has a wide-angle luminous intensity distribution characteristic with high luminous intensity in both an optical axis direction and a direction crossing the optical axis direction. However, the bulb-type lamp has a luminous intensity distribution characteristic with high luminous intensity in an optical axis direction opposed to the front of the light source and low luminous intensity in a direction crossing the optical axis direction. Therefore, the use of the bulb-type lamp is unsuitable depending on a luminaire.

Therefore, it is ideal that, like the incandescent lamp, the bulb-type lamp has the wide-angle luminous intensity distribution characteristic with the high luminous intensity in both the optical axis direction and the direction crossing the optical axis direction. In the bulb-type lamp, diffusibility is often imparted to the globe that covers the light source. However, with the diffusion by the globe, it is difficult to obtain sufficient improvement of luminous intensity in the direction crossing the optical axis direction.

Therefore, in some bulb-type lamp, a lens is arranged to be opposed to the light source, light traveling from the light source in the optical axis direction is reflected to the direction crossing the optical direction by the lens to improve the luminous intensity in the direction crossing the optical axis direction.

CITATION LIST

Patent Literature

PTL 1: U.S. Pat. No. 6,803,607

SUMMARY OF INVENTION

Technical Problem

However, with the lens in the past, although it is possible to increase the luminous intensity in the direction crossing the optical axis direction, instead, the luminous intensity in the optical axis direction markedly decreases. Therefore, it may be impossible to obtain the ideal wide-angle luminous intensity distribution characteristic with the high luminous intensity in both the optical axis direction and the direction crossing the optical axis direction.

The present invention has been devised in view of the above and it is an object of the present invention to provide a lens that can obtain a wide-angle luminous intensity distribution with high luminous intensity in both an optical axis direction and a direction crossing the optical axis direction, a lighting device and a bulb-type lamp in each of which the lens is used, and a luminaire in which the bulb-type lamp is used.

Solution to Problem

A lens according to an embodiment includes a first lens section and a second lens section, which are integrally formed. The first lens section is formed in a generally hemispherical shell shape including a first recess opened toward one side of an optical axis direction in which light from a light source is made incident. The second lens section is formed in a generally hemispherical shell shape including a second recess opened toward the other side of the optical axis direction.

DESCRIPTION OF EMBODIMENTS

An embodiment is explained below with reference to the drawings.

Figure 1:
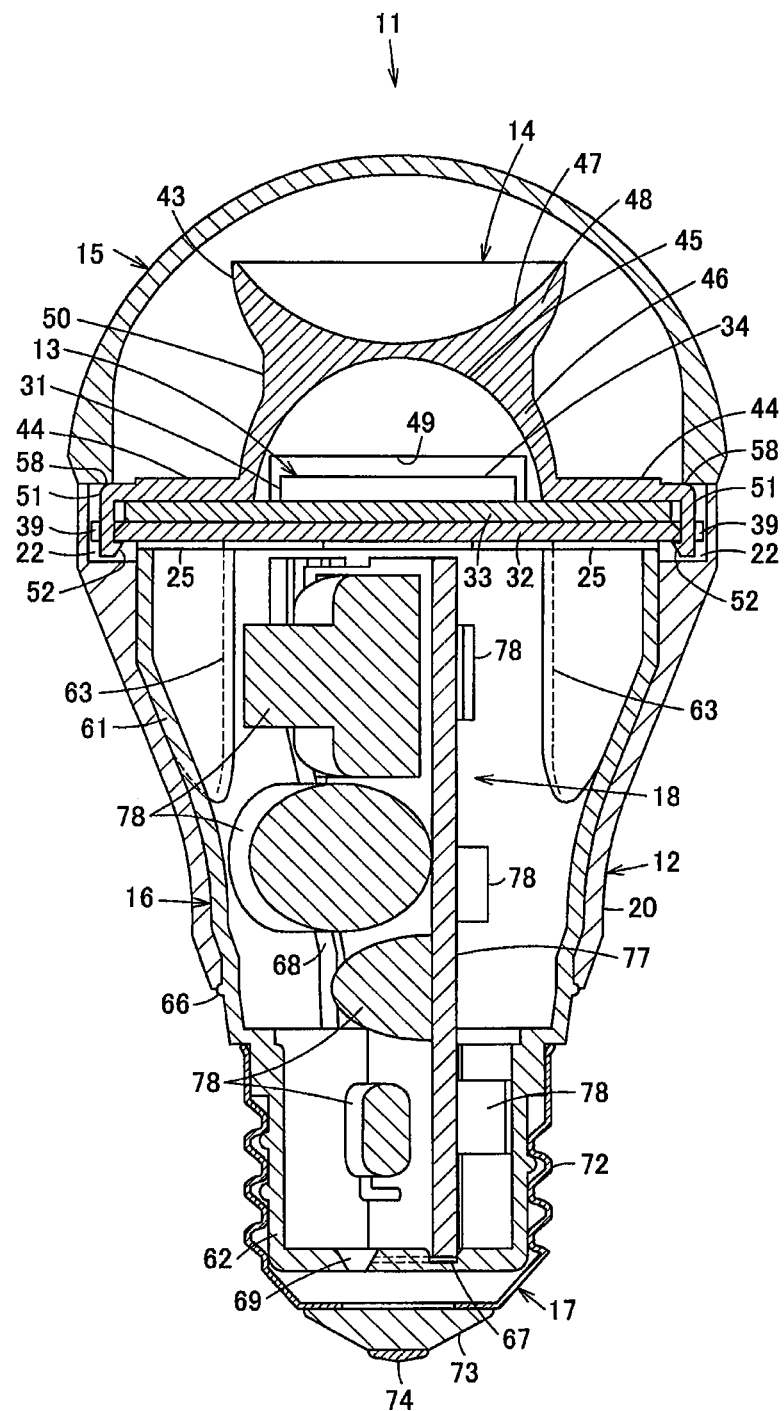
FIG. 1 is a sectional view of a bulb-type lamp showing a first embodiment.
Figure 2:
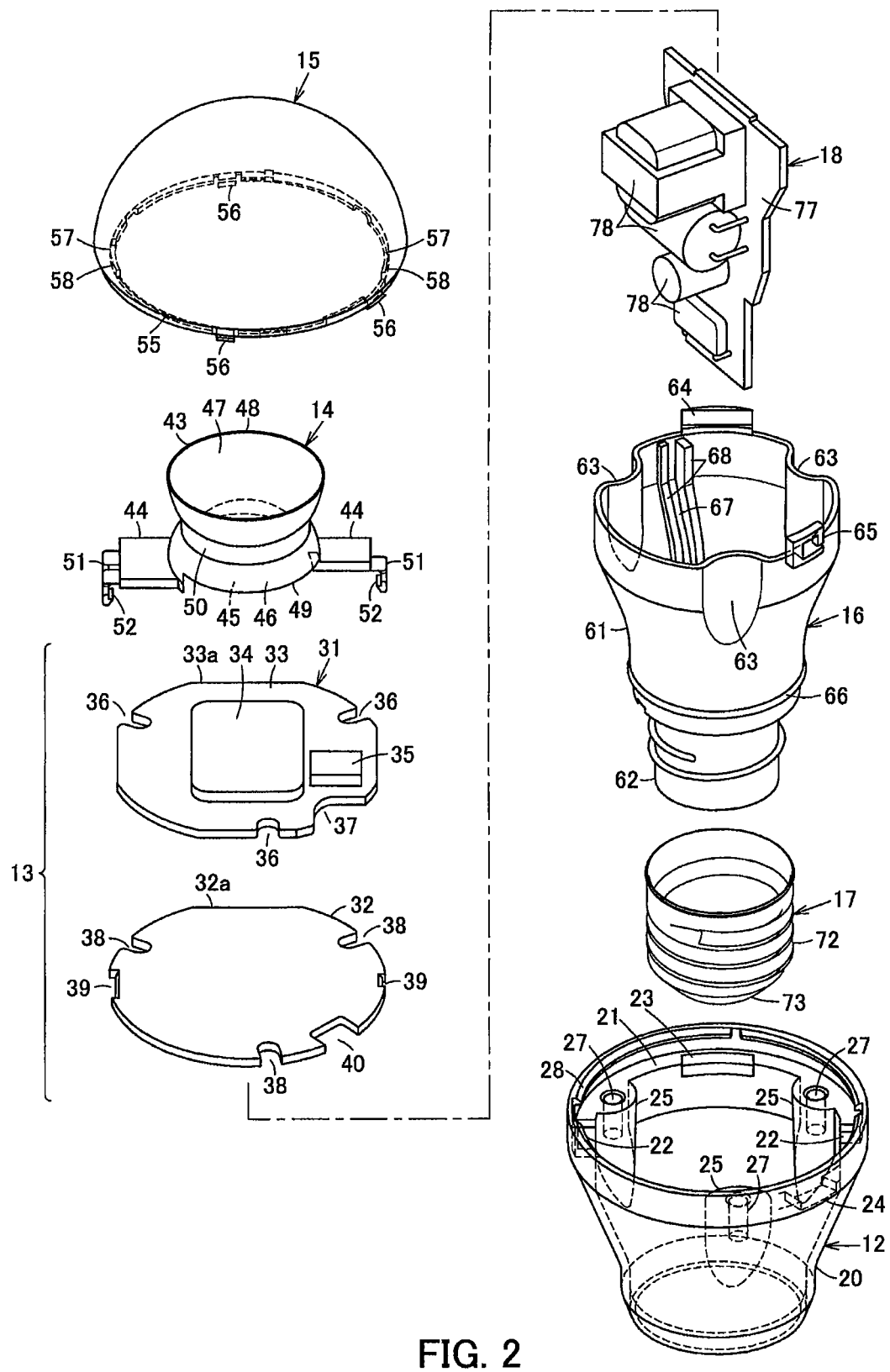
FIG. 2 is a perspective view of a disassembled state of the bulb-type lamp.
Figure 3:
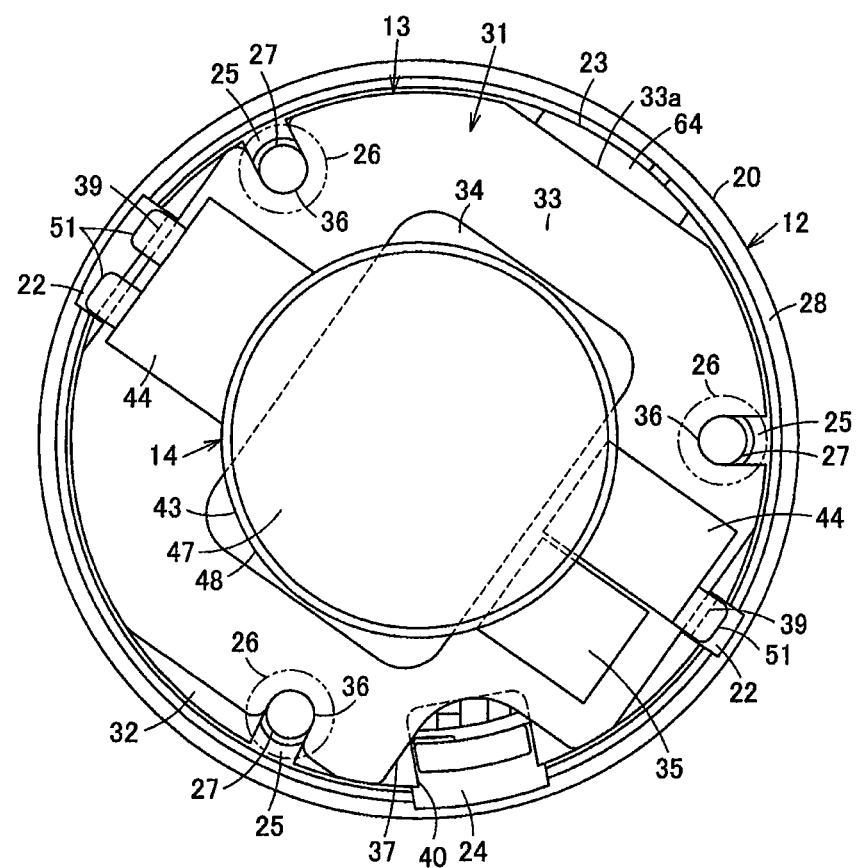
FIG. 3 is a plan view of a state in which a globe of the bulb-type lamp is removed.
Figure 4:
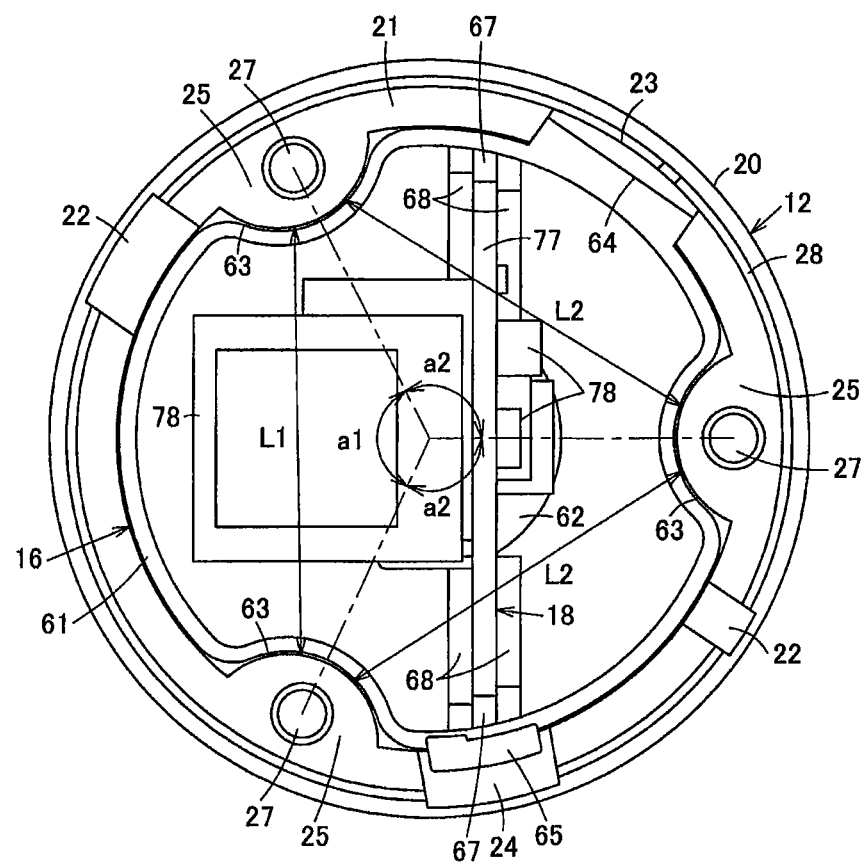
FIG. 4 is a plan view showing a base body, a cover, and a lighting circuit of the bulb-type lamp.

In FIGS. 1 and 2, reference numeral 11 denotes a bulb-type lamp functioning as a lighting device. The bulb-type lamp 11 includes a cylindrical base body 12, a light source unit 13 attached to one end side of the base body 12 (one end side of a lamp axis that connects a globe and a cap of the bulb-type lamp 11), a lens 14 attached to the light source unit 13, a globe 15 attached to one end side of the base body 12 to cover the light source unit 13 and the lens 14, a cover 16 arranged in the base body 12, a cap 17 attached to the other end of the cover 16 on the other end side of the base body 12, and a lighting circuit 18 arranged in the cover 16. In the bulb-type lamp 11, the length in the lamp axis direction and the outer diameter of a maximum diameter portion of the globe 15 are a dimension equivalent to the dimension of a mini krypton bulb. The bulb-type lamp 11 is formed in a shape close to the shape of the mini krypton bulb.

As shown in FIGS. 1 to 4, the base body 12 includes a base body section 20 formed of metal such as aluminum or ceramics excellent in thermal conductivity and heat radiation properties and formed in a cylindrical shape expanding in diameter from the other end side to the one end side.

In the inner circumferential portion on the one end side of the base body 12, an annular attachment surface 21 to which the light source unit 13 is attached is formed to face the one end side of the base body 12. On the attachment surface 21, a pair of hollow sections 22 for lens attachment located in symmetrical positions with respect to the center of the base body 12, a hollow section 23 for cover attachment, and a hollow section 24 for wiring are formed.

In the inner circumferential portion on the one end side of the base body 12, a plurality of boss sections 25 forming a part of the attachment surface 21 are formed to project from the inner surface of the base body 12. Attachment holes 27 into which screws 26 for attaching the light source unit 13 are screwed are formed in the buss sections 25. In this embodiment, the base body 12 includes three boss sections 25. However, the boss sections 25 are not arranged at equal intervals in the circumferential direction of the base body 12. The boss sections 25 are arranged such that only an interval L1 in one place is wider than intervals L2 in other two places among intervals in three places in the circumferential direction formed by the boss sections 25 adjacent to one another. That is, the boss sections 25 are arranged such that an angle a1 in one place is larger than angles a2 in the other places among angles in the three places formed by the boss sections 25 adjacent to one another. The intervals L2 and the angles a2 in the other two places are the same.

In the inner circumferential portion on the one end side of the base body 12, a claw-like globe attaching section 28 to which the globe 15 is attached is formed to project. Places of the globe attaching section 28 corresponding to the hollow sections 22 and 24 are formed to be cut out.

The thickness of the base body section 20 excluding the places of the boss sections 25 of the base body 12 is smaller than thickness necessary for forming the attachment holes 27 into which the screws 26 are screwed. That is, the thickness is formed smaller than the diameter dimension of the boss sections 25 that form the attachment holes 27. Consequently, a space necessary for housing the lighting circuit 18 and the like on the inner side of the base body 12 is secured while the external shape of the base body 12 is reduced to the mini krypton bulb size.

Alumite treatment or heat radiation fins may be provided on the surface of the base body 12 to improve heat radiation properties.

The light source unit 13 is configured by a light-emitting module 31 and a radiator plate 32.

The light-emitting module 31 includes a disk-like substrate (a module substrate) 33 formed of metal such as aluminum or ceramics excellent in thermal conductivity, a surface light source 34 as a light source formed in the center region of one surface of the substrate 33, and a connector 35 mounted in the peripheral region of the one surface of the substrate 33.

In the surface light source 34, a semiconductor light-emitting element such as an LED element or an EL element including a planar light-emitting surface equal to or larger than φ2 mm is used. In this embodiment, the LED element is used as the semiconductor light-emitting element. A COB (Chip On Board) system for mounting a plurality of LED elements on the substrate 33 is adopted. That is, a plurality of LED elements are mounted on the substrate 33. The plurality of LED elements are electrically connected in series by wire bonding. The plurality of LED elements are integrally covered and sealed by a phosphor layer formed of transparent resin such as silicone resin mixed with a phosphor. As the LED element, for example, an LED element that emits blue light is used. A phosphor excited by a part of the blue light from the LED element to radiate yellow light is mixed in the phosphor layer. Therefore, the surface light source 34 is configured by the LED element, the phosphor layer, and the like. The surface of the phosphor layer, which is the surface of the surface light source 34, is formed as a light-emitting surface. White illumination light is radiated from the light-emitting surface. In this embodiment, the light-emitting surface of the surface light source 34 is formed in a rectangular shape. However, the light-emitting surface is not limited to this shape and may be formed in a square shape, a circular shape, or other shapes.

A not-shown wiring pattern is formed on the one surface of the substrate 33. The plurality of LED elements and the connector 35 are connected to the wiring pattern. In the peripheral portion of the substrate 33, a plurality of insert-through holes 36, through which the screws 26 screwed into the boss sections 25 are inserted, are formed to correspond to the positions of the boss sections 25 of the base body 12 and a cutout section 37 is formed to correspond to the hollow section 24 for wiring of the base body 12. The insert-through holes 36 are formed by insert-through grooves opening in the outer diameter direction of the substrate 33.

The radiator plate 32 is formed of metal such as aluminum or ceramics excellent in thermal conductivity. The other surface of the substrate 33 of the light-emitting module 31 is set in contact with one surface of the radiator plate 32 to be capable of conducting heat.

In the peripheral portion of the radiator plate 32, a plurality of insert-through holes 38, through which the screws 26 screwed into the boss sections 25, are formed to correspond to the positions of the boss sections 25 of the base body 12, a pair of hollow-like lens attaching sections 39 for attaching the lens 14 are formed to correspond to the positions of the hollow sections 22 for lens attachment of the base body 12, and a cutout section 40 is formed to correspond to the hollow section 24 for wiring of the base body 12. The insert-through holes 38 are formed by insert-through grooves opening in the outer diameter direction of the radiator plate 32.

When the radiator plate 32 and the substrate 33 of the light-emitting module 31 are combined, the external shape of the substrate 33 is small to correspond to the positions of the lens attaching sections 39 of the radiator plate 32 and the lens attaching sections 39 are configured to be arranged to project further in the outer diameter direction than the substrate 33. In parts of the outer side portions of the radiator plate 32 and the substrate 33 of the light-emitting module 31, positioning surfaces 32a and 33a having a flat shape, which match each other in a state in which the radiator plate 32 and the substrate 33 are properly assembled to the base body 12, are respectively formed.

The lens 14 is integrally formed of transparent resin such as polycarbonate having a refractive index of 1.45 to 1.6. The lens includes a lens main body 43 opposed to the surface light source 34 to control light from the surface light source 34 and a pair of attachment legs 44 for attaching the lens main body 43 to the light source unit 13.

The lens main body 43 includes a first lens section 46 having a generally hemispherical shell shape or a partially spheroidal shape including a first recess 45 opened toward one side of an optical axis direction in which light from the surface light source 34 is made incident, i.e., the other end side of a lamp axis direction and a second lens section 48 having a generally hemispherical shell shape or a partially spheroidal shape including a second recess 47 opened toward the other side in the optical axis direction, i.e., one end side of the lamp axis direction. The lens main body 43 is formed in a shape obtained by opposing and integrating the one end side of the lamp axis direction of the first lens section 46 and the other end side of the lamp axis direction of the second lens section 48.

When the length of one side (or the diameter) of the light-emitting surface of the surface light source 34 is represented as L and the distance between the optical axis centers of the first recess 45 of the first lens section 46 and the surface light source 34 is represented as R, the area of the light-emitting surface of the surface light source 34 is designed such that L≥R/2. As explained above, in this embodiment, the semiconductor light-emitting element including the light-emitting surface equal to or larger than φ2 mm is used.

The recesses 45 and 47 of the lens sections 46 and 48 are formed by a partially spheroidal surface. The outer surfaces of the lens sections 46 and 48 are formed by a partially spheroidal surface similar to the recesses 45 and 47. The radius of the second recess 47 is formed larger than the radius of the first recess 45. Further, the radius of the second lens section 48 is formed larger than the radius of the first lens section 46. The thickness of the first lens section 46 gradually increases and the thickness of the second lens section 48 gradually decreases further apart from the surface light source 34.

At the end portion on the other end side of the first lens section 46, a groove-like relief section 49 separating from the surface light source 34 is formed excluding the places of the pair of attachment legs 44.

Figure 6:
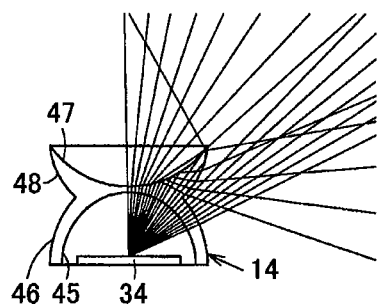
FIG. 6 is an explanatory diagram showing a state in which light emitted from the center portion of a surface light source of the bulb-type lamp is subjected to luminous intensity distribution by a lens.
Figure 7:
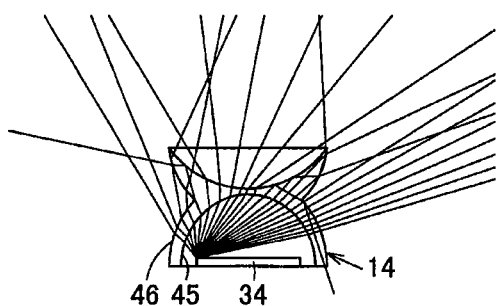
FIG. 7 is an explanatory diagram showing a state in which a course of light emitted from the peripheral portion of the surface light source of the bulb-type lamp is subjected to luminous intensity distribution by the lens.
Figure 8:
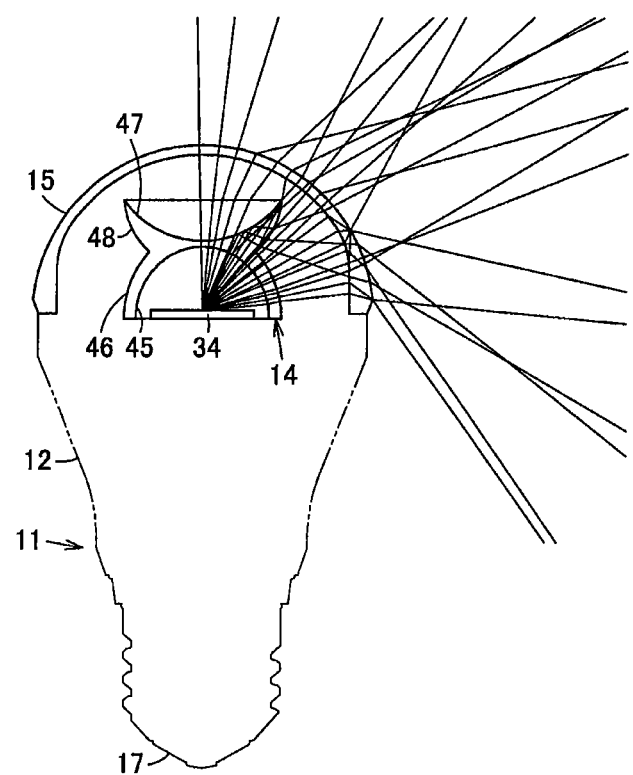
FIG. 8 is an explanatory diagram showing a state in which a course of the light emitted from the center portion the surface light source of the bulb-type lamp is subjected to luminous intensity distribution by the lens and the globe.

In a connection place of the outer surface of the first lens section 46 and the outer surface of the second lens section 48, a continuous section 50 that allows the outer surface of the first lens section 46 and the outer surface of the second lens section 48 to be continuous is formed. The continuous section 50 is formed in, for example, the cylindrical shape shown in FIG. 1 to thereby be formed as a plane or a curved surface or formed in a smoothly-continuous non-acute angle shape obtained by combining the plane and the curved surface to prevent a crossing point of the outer surface of the first lens section 46 and the outer surface of the second lens section 48 from forming an acute angle. It is also possible to form the continuous section 50 in an acute angle shape as shown in FIGS. 6 to 8.

The curvatures of the partially spheroidal surfaces of the recesses 45 and 47 and the outer surface of the lens sections 46 and 48, the positions in the lamp axis direction of the lens sections 46 and 48, and the shapes and the dimensions of the continuous sections 50 and the like are set as appropriate according to necessary luminous intensity distribution and other conditions.

The attachment legs 44 are projected from symmetrical positions with respect to the center of the lens 14 on the other end side of the axis direction of the first lens section 46 to a side direction crossing the lamp axis direction and set in contact and attached to the one surface of the substrate 33 of the light-emitting module 31. Substantially L-shaped locking sections 51 that project toward the other end direction of the lamp axis direction and fit in the outer side surface of the lens attaching section 39 of the radiator plate 32 are protrudingly provided at the distal ends of the attachment legs 44. Claw sections 52 caught by the other surface of the radiator plate 32 are formed at the distal end of the locking sections 51. The locking sections 51 of the attachment legs 44 attached to the light source unit 13 are housed in the hollow section 22 for lens attachment of the base body 12. One attachment leg 44 is wide. Two locking sections 51 are provided in the one attachment leg 44. The other attachment leg 44 is narrow. One locking section 51 is provided in the other attachment leg 44. Since the other attachment leg 44 is arranged on a side of the connector 35 of the light-emitting module 31, the other attachment leg 44 is formed narrow in order to prevent interference with the connector 35.

The lens main body 43 of the lens 14 may be formed of a glass material. In this case, the attachment legs 44 only have to be formed as separate bodies and include structure for holding the lens main body 43.

The globe 15 is formed of a material such as synthetic resin or glass having translucency and light diffusing properties and formed in a dome shape opened toward the other end side of the lamp axis direction. At an opening edge portion on the other end side of the globe 15, a fitting section 55 fit on the inner side of the globe attaching section 28 of the base body 12 is protrudingly formed and a plurality of locking claws 56 locked to the globe attaching section 28 in a state in which the fitting section 55 is fit on the inner side of the globe attaching section 28 are formed. Further, in the fitting section 55, a pair of positioning grooves 57 that engage with the locking sections 51 of the attachment legs 44 of the lens 14 and stop the rotation of the globe 15 with respect to the base body 12 are formed and pressing sections 58 that come into contact with the locking sections 51 of the attachment legs 44 of the lens 14 and press the attachment legs 44 to the light source unit 13 are formed in the portions of the positioning grooves 57. An outer diameter dimension of the other end side, which is the opening section side, of the globe 15 is formed larger than the outer diameter dimension of the base body 12.

The cover 16 is formed of an insulating material such as PBT resin and formed in a cylindrical shape opened toward the one end side of the lamp axis direction and closed on the other end side. In the cover 16, a cover main body 61 arranged on the inner side of the base body 12 and a cap attaching section 62 projecting from the other end side of the base body 12 are formed.

The cover main body 61 is formed in a shape expanded toward the one end side of the lamp axis direction, which is similar to the inner surface shape of the base body 12, to be arranged along the inner surface of the base body 12. A plurality of hollow sections 63, in which the boss sections 25 of the base body 12 fit, are formed on the outer surface of the cover main body 61. On the other end side of the cover main body 61, a positioning section 64 that fits in the hollow section 23 for cover attachment of the base body 12 and comes into contact with the positioning surfaces 33*a* and 32*a* of the substrate 33 and the radiation plate 32 of the light source unit 13 and positions the positioning surfaces 33*a* and 32*a* is protrudingly formed. A wiring guide 65 is also formed protrudingly. Apart of the other end of the cover main body 61 is projected from the base body 12. An annular locking section 66 that locks to the other end of the base body 12 is formed on the outer circumferential surface of this projecting portion.

A pair of substrate attachment grooves 67 opposed to each other are formed along the lamp axis direction from the cover main body 61 to the inner surface of the cap attaching section 62. The pair of substrate attaching grooves 67 are formed in a position crossing a region where the interval between the adjacent boss sections 25 of the base body 12 is wide and a position offset from the center of the cover 16 to separate from the region where the interval between the adjacent boss sections 25 of the base body 12 is wide. A pair of substrate holding sections 68 that form the substrate attachment grooves 67 are formed on the inner surface of the cover main body 61.

A pair of wiring holes 69 for connecting the cap 17 and the lighting circuit 18 with a lead wire are formed on the end face of the cap attaching section 62.

The cap 17 can be connected to a socket for a general illumination bulb of the E17 type. The cap 17 includes a shell 72 screwed and fixed to the circumferential surface of the cap attaching section 62 of the cover 16, an insulating section 73 provided on the other end side of the shell 72, and an eyelet 74 provided at the top of the insulating section 73.

The lighting circuit 18 is a circuit that supplies a constant current to the LED element of the light-emitting module 31. The lighting circuit 18 includes a lighting circuit board 77 and a plurality of lighting circuit components 78 mounted on the lighting circuit board 77.

One surface of the lighting circuit board 77 is a mounting surface on which the main lighting circuit components 78 are mounted. The other surface of the lighting circuit board 77 is a wiring pattern surface on which a wiring pattern electrically connected to the lighting circuit components 78 is formed.

The lighting circuit board 77 is inserted from one end side of the cover 16. Both sides of the lighting circuit board 77 are fit in the substrate attachment grooves 67 and held. Therefore, the lighting circuit board 77 is longitudinally arranged along the lamp axis direction in the cover 16. The lighting circuit board 77 is arranged in an offset position from the centers of the base body 12 and the cover 16 such that the mounting surface of the lighting circuit board 77 is opposed to the region where the interval between the adjacent boss sections 25 of the base body 12 is wide, the wiring pattern surface is directed to the opposite side with respect to the region where the interval between the adjacent boss sections 25 of the base body 12 is wide, and the distance between the mounting surface and the inner surface of the cover 16 is larger than the distance between the wiring pattern surface and the inner surface of the cover 16.

On the mounting surface of the lighting circuit board 77, the plurality of lighting circuit components 78, which are discrete components, including lead wires are mounted. The leading wires of the lighting circuit components 78 are soldered and connected to the wiring pattern on the wiring pattern surface piercing through the lighting circuit board 77. The lighting circuit components 78 mounted on the mounting surface of the lighting circuit board 77 includes an electrolytic capacitor of a rectifying and smoothing circuit that rectifies and smoothes an alternating-current voltage, an inductor of a chopper circuit that converts the rectified and smoothed voltage into a predetermined voltage, large components such as resistors used in other circuits, and small components such as switching elements, capacitors, and diodes of other chopper circuits. Among the lighting circuit components 78 mounted on the mounting surface of the lighting circuit board 77, larger components are arranged on one end side where the inner diameter of the cover 16 is larger and smaller components are arranged on the other end side where the inner diameter of the cover 16 is smaller. The lighting circuit components 78 mounted on the mounting surface of the lighting circuit board 77 are arranged in the region where the interval between the adjacent boss sections 25 of the base body 12 is wide.

On the wiring pattern surface of the lighting circuit board 77, surface mounting components among the lighting circuit components 78 are surface-mounted. The surface mounting components include a chip resistor and a chip capacitor.

On the input side of the lighting circuit 18, not-shown lead wires for input are respectively electrically connected to the shell 72 and the eyelet 74 of the cap 17 through the wiring holes 69 of the cover 16. A lead wire for output including a not-shown connector connected to the connector 35 of the light-emitting module 31 is connected to the output side of the lighting circuit 18.

To assemble the bulb-type lamp 11, the lighting circuit 18 is inserted into the cover 16 from the one end side of the cover 16, the lead wires for input inserted through the wiring holes 69 of the cover 16 are connected to the cap 17, and the cap 17 is attached to the cap attaching section 62 of the cover 16.

The cover 16 incorporating the lighting circuit 18 and the cap 17 is inserted from one end side of the base body 12, the other end side of the cover 16 including the cap 17 is projected from the other end side of the base body 12, and the locking section 66 of the cover 16 is locked to the other end of the base body 12 and prevented from coming off. At this point, the hollow sections 63 of the cover 16 are adjusted to and fit in the positions of the boss sections 25 of the base body 12. The positioning section 64 and the wiring guide 65 of the cover 16 are adjusted to and fit in the hollow section 23 and the hollow section 24 of the base body 12. Consequently, the cover 16 can be positioned with respect to and fit in the base body 12. The rotation of the cover 16 after being fit is stopped.

The radiator plate 32 and the substrate 33 of the light-emitting module 31, which configure the light-source unit 13, are incorporated in order from the one end side of the base body 12 incorporating the cover 16 and the like and arranged on the attachment surface 21. At this point, since the positioning section 64 of the cover 16 incorporated in the base body 12 projects from the attachment surface 21, the positioning surface 32*a* of the radiator plate 32 and the positioning surface 33*a* of the substrate 33 are adjusted to the positioning section 64, whereby the radiator plate 32 and the substrate 33 can be positioned with respect to and incorporated in the base body 12. Consequently, the insert-through holes 38 of the radiator plate 32 and the insert-through holes 36 of the substrate 33 are arranged coaxially with the attachment holes 27 of the boss sections 25 of the base body 12. The screws 26 are screwed in the attachment holes 27 of the boss sections 25 through the insert-through holes 36 of the substrate 33 and the insert-through holes 38 of the radiator plate 32. The attachment surface 21 of the base body 12, the radiator plate 32, and the substrate 33 are closely attached to one another to be capable of conducting heat. The light source unit 13 is fixed to the base body 12.

When the light source unit 13 is incorporated in the base body 12, the lead wire for output of the lighting circuit 18 is drawn out to the one surface side of the light-emitting module 31 through the cutout section 40 of the radiator plate 32 and the cutout section 37 of the substrate 33 and the wiring guide 65 of the cover 16. After the light source unit 13 is incorporated in the base body 12, the connector at the distal end of the lead wire is connected to the connector 35 of the light-emitting module 31.

The locking sections 51 of the attachment legs 44 of the lens 14 are inserted into the lens attaching sections 39 of the radiator plate 32 of the light source unit 13 through the hollow sections 22 for lens attachment. The claw sections 52 of the locking sections 51 are hooked to the other surface of the radiator plate 32. Consequently, the locking sections 51 of the attachment legs 44 of the lens 14 fit in the lens attaching sections 39 of the radiator plate 32. The position of the lens 14 with respect to a direction parallel to the surfaces of the substrate 33 and the radiator plate 32 can be determined. The substrate 33 and the radiator plate 32 can be held between the attachment legs 44 and the claw sections 52. The position of the lens 14 with respect to a direction perpendicular to the surfaces of the substrate 33 and the radiator plate 32 can be determined. The lens 14 can be accurately positioned and held in the light source unit 13. The attachment legs 44 of the lens 14 may be bonded and fixed to the light source unit 13 and the base body 12 by applying or filling an adhesive such as silicone resin or cement to or in the hollow sections 22 for lens attachment of the base body 12. As the adhesive, an adhesive used for attaching the globe 15 to the base body 12 may be used.

The adhesive such as silicone resin or cement is applied to the inner circumference of the globe attaching section 28 of the base body 12 and the positioning grooves 57 of the globe 15 are positioned in the locking sections 51 of the attachment legs 44 of the lens 14 to attach the globe 15 to the base body 12, whereby the locking claws 56 of the globe 15 are locked to the globe attaching section 28 and the globe 15 is fit in and fixed to the base body 12. In this way, a fitting and locking structure is adopted for the fixing of the globe 15 to the base body 12. Therefore, when the adhesive is concurrently used, it is possible to reduce an amount of use of the adhesive compared with the past. Even if the adhesive is not concurrently used, it is possible to surely fix the globe 15 to the base body 12. The globe 15 is attached to the base body 12, whereby the pressing section 58 of the globe 15 comes into contact with the locking sections 51 of the attachment legs 44 and presses the attachment legs 44 to the light source unit 13.

An assembly procedure for the bulb-type lamp 11 is not limited to the above. Another attachment procedure may be adopted.

Figure 5:
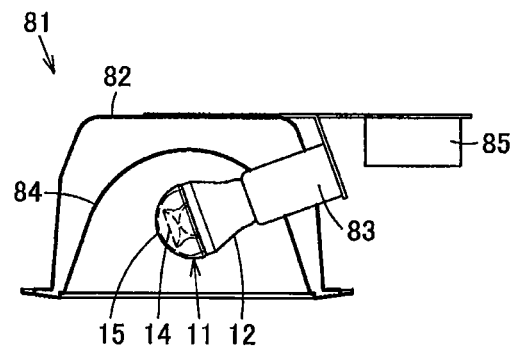
FIG. 5 is a sectional view of a lighting device in which the bulb-type lamp is used.

In FIG. 5, a luminaire 81, which is a downlight in which the bulb-type lamp 11 is used, is shown. The luminaire 81 includes a luminaire main body 82. In the luminaire main body 82, a socket 83 to which the bulb-type lamp 11 is attached in a state in which a lamp axis turns obliquely sideways and a reflector 84 that reflects light radiated from the bulb-type lamp 11 downward are disposed. In FIG. 5, reference numeral 85 denotes a terminal stand.

When the bulb-type lamp 11 is attached to the socket 83 of the luminaire 81 and energized, the lighting circuit 18 operates, electric power is supplied to a plurality of LED chips of the light-emitting module 31, the plurality of LED chips are lit, light is radiated from the surface light source 34, the light radiated from the surface light source 34 is made incident on the lens 14, and the light subjected to luminous intensity distribution control by the lens 14 is radiated to the outside through the globe 15.

Heat generated during the lighting of the plurality of LED chips of the light-emitting module 31 is mainly conducted to the substrate 33 and conducted from the substrate 33 to the radiator plate 32. Further, the heat is conducted from the radiator plate 32 to the base body 12 and radiated into the air from the surface of the base body 12.

Light control by the lens 14 of the bulb-type lamp 11 is explained.

As shown in FIGS. 6 to 8, light emitted from the light-emitting surface of the surface light source 34 is made incident on the first lens section 46 passing through a space in the first recess 45 of the first lens section 46. The light made incident on the first lens section 46 rushes into the inner surface of the second recess 47 of the second lens section 48, the outer surface of the second lens section 48, and the outer surface of the first lens unit 46, which are respectively interfaces with an air layer (refractive index=1). The light is refracted according to inrush angles of the light and emitted to the outside of the lens 14.

When the light made incident on the first lens 46 rushes into the inner surface of the second recess 47 of the second lens section 48, the light having the large inrush angle causes total reflection. A traveling direction of the light greatly changes.

FIG. 6 shows a state in which light emitted from the center portion of the surface light source 34 is subjected to luminous intensity distribution by the lens 14. Lights having small inrush angles rushing into the inner surface of the second recess 47 of the second lens section 48, the outer surface of the second lens section 48, and the outer surface of the first lens section 46 change little in traveling directions. The lights are mainly emitted toward a front direction opposed to the surface light source 34 and emitted toward a side direction parallel to the surface light source 34 as well. On the other hand, light having a large inrush angle rushing into the inner surface of the second recess 47 of the second lens section 48 is totally reflected to change greatly in a traveling direction. The light is emitted toward a rear direction opposite to the front direction in addition to the side direction. Therefore, the light emitted from the center portion of the surface light source 34 can be subjected to luminous intensity control at a wide angle from the front direction to the side direction and the rear direction by the lens 14.

FIG. 7 shows a state in which a course of light emitted from the peripheral portion of the surface light source 34 is subjected to luminous intensity distribution by the lens 14. In this case, likewise, lights having small inrush angles rushing into the inner surface of the second recess 47 of the second lens section 48, the outer surface of the second lens section 48, and the outer surface of the first lens section 46 change little in traveling directions. The lights are mainly emitted toward the front direction opposed to the surface light source 34 and emitted toward the side direction parallel to the surface light source 34 as well. On the other hand, light having a large inrush angle rushing into the inner surface of the second recess 47 of the second lens section 48 is totally reflected to greatly change in a traveling direction. The light is emitted toward the side direction and the rear direction. Therefore, the light emitted from the peripheral portion of the surface light source 34 can be subjected to luminous intensity control at a wide angle from the front direction to the side direction and the rear direction by the lens 14.

In the lens 14, the radius of the second recess 47 is formed larger than the radius of the first recess 45. Therefore, it is possible to increase a region where an inrush angle of light rushing into the inner surface of the second recess 47 becomes large and increase light emitted toward the side direction and the rear direction.

FIG. 8 shows a state in which a course of light emitted from the center portion of the surface light source 34 is subjected to luminous intensity distribution by the lens 14 and the globe 15. Light passed through the lens 14 is made incident on the globe 15. The light made incident on the globe 15 is diffused from a milky-white surface (a pear ground surface) of the globe 15 and radiated to the outside. At this point, light emitted from the lens 14 in the side direction and the rear direction tends to be radiated from the globe 15 toward the side direction and the rear direction. Therefore, light of the surface light source 34 can be subjected to luminous intensity distribution at a wide angle from the front direction to the side direction and the rear direction by the lens 14 and the globe 15.

The outer diameter dimension on the other end side, which is the opening section side, of the globe 15 is formed larger than the outer diameter dimension of the base body 12. Therefore, it is possible to irradiate light in the rear direction from the globe 15. Wider-angle luminous intensity distribution is easily obtained.

In FIGS. 9 to 12, results obtained by measuring luminous intensity distribution by changing conditions are respectively shown. A 0° direction is the front direction opposed to the surface light source 34, a 90° direction is the side direction, and a 180° direction is the rear direction.

Figure 9:
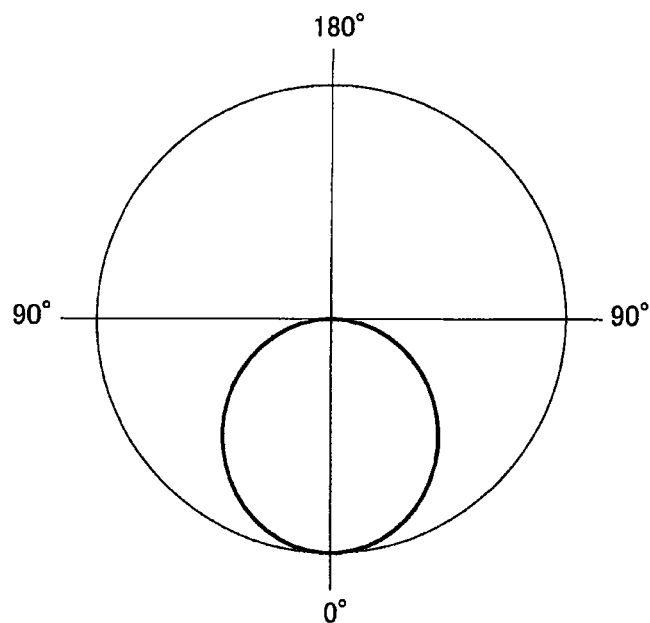
FIG. 9 is a luminous intensity distribution diagram showing luminous intensity distribution in the surface light source alone.

FIG. 9 is a luminous intensity distribution diagram showing luminous intensity distribution in the surface light source 34 alone. Luminous intensity distribution in the front direction opposed to the surface light source 34 is high. The spread of luminous intensity distribution in the side direction is small. No light is emitted in the rear direction.

Figure 10:
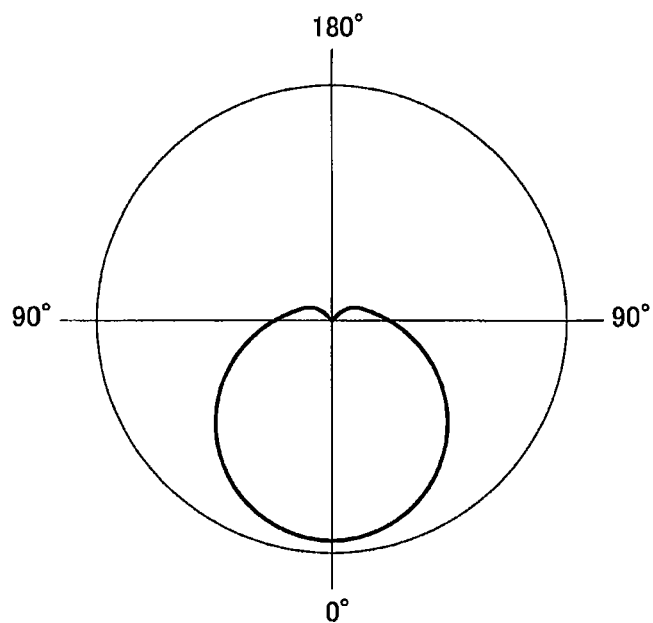
FIG. 10 is a luminous intensity distribution diagram showing luminous intensity distribution of a combination of the surface light source and the globe.

FIG. 10 is a luminous intensity distribution diagram showing luminous intensity distribution obtained by combining the surface light source 34 and the globe 15. Luminous intensity distributions in the side direction and the rear direction is widened compared with the luminous intensity distribution shown in FIG. 9 by the diffusibility of the globe 15.

Figure 11:
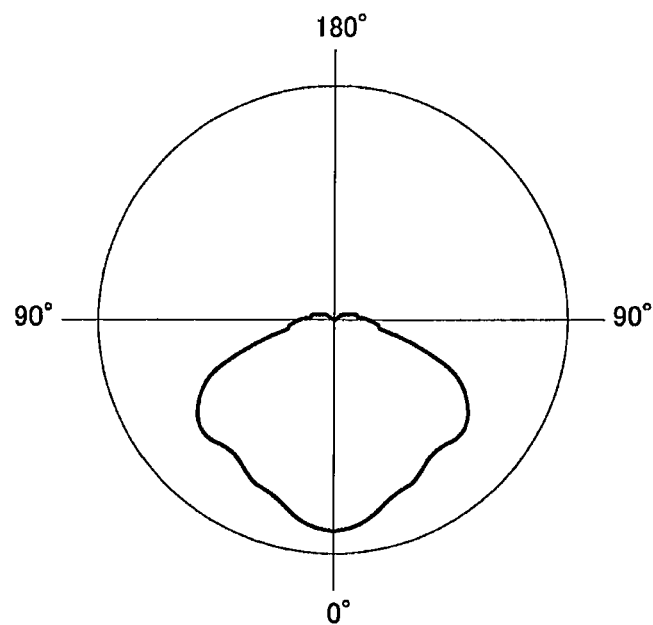
FIG. 11 is a luminous intensity distribution diagram showing luminous intensity distribution of a combination of the surface light source and the lens.

FIG. 11 is a luminous intensity distribution diagram showing luminous intensity distribution obtained by combining the surface light source 34 and the lens 14. In particular, luminous intensity distribution in the side direction is widened by the lens 14 compared with the luminous intensity distributions shown in FIGS. 9 and 10 while luminous intensity distribution in the front direction is secured.

Figure 12:
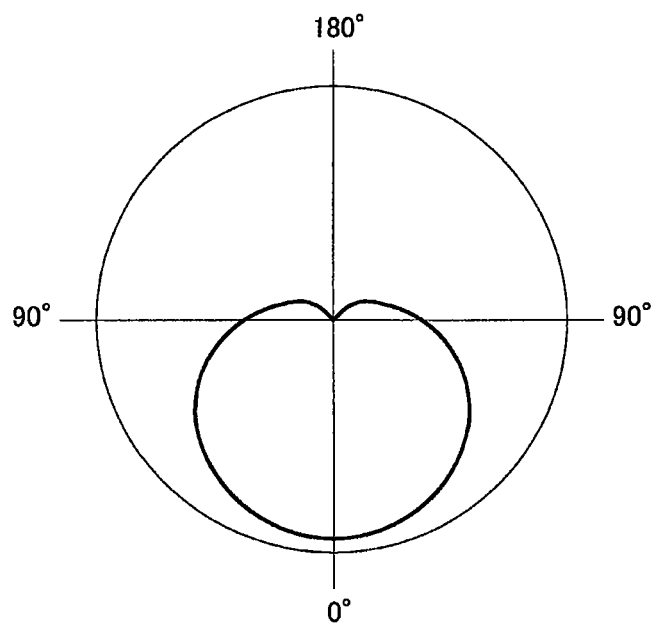
FIG. 12 is a luminous intensity distribution diagram showing luminous intensity distribution of a combination of the surface light source, the lens, and the globe.

FIG. 12 is a luminous intensity distribution diagram showing luminous intensity distribution obtained by combining the surface light source 34, the lens 14, and the globe 15. Luminous intensity is high in both the front direction and the side direction in the same degree. Luminous intensity distribution in the rear direction is also obtained. A luminous intensity distribution characteristic close to the luminous intensity distribution characteristic of the mini krypton bulb is obtained.

As explained above, with the lens 14 in this embodiment, it is possible to increase light traveling from the lens 14 in the direction crossing the optical axis direction while securing light traveling from the lens 14 in the optical axis direction according to an inrush angle of light from the surface light source 34 rushing into the second lens section 48 having the generally hemispherical shell shape or the partially spheroidal shape from the first lens section 46 having the generally hemispherical shell shape or the partially spheroidal shape of the lens 14. Both luminous intensity in the optical axis direction and luminous intensity in the direction crossing the optical axis direction are high and a wide-angle luminous intensity distribution characteristic is obtained.

Even in the surface light source 34 having a wide area, the area of the light-emitting surface of which is, for example, equal to or larger than ϕ2 mm, a wide-angle luminous intensity distribution characteristic is obtained.

Further, the first recess 45 and the second recess 47 are formed as the partially spheroidal surfaces. Consequently, a wide-angle luminous intensity distribution characteristic uniform with respect to the periphery centering on the optical axis is obtained.

Further, the radius of the second recess 47 is formed larger than the radius of the first recess 45. Consequently, the region of the second recess 47 for increasing light traveling from the lens 14 in the direction crossing the optical axis direction is increased and a wide-angle luminous intensity distribution characteristic is obtained.

The outer surface of the first lens section 46 having the generally hemispherical shell shape and the outer surface of the second lens section 48 having the generally hemispherical shell shape are allowed to be continuous by the continuous section 50. The cylindrical shape or the like is formed in the continuous section 50. Consequently, when the continuous section 50 is formed in a non-acute angle shape to prevent the crossing point of the outer surface of the first lens section 46 and the outer surface of the second lens section 48 from forming an acute angle, it is possible to easily form the lens 14.

When the lens main body 43 of the lens 14 comes into contact with the surface light source 34, the heat of the surface light source 34 is conducted to the lens main body 43. The lens main body 43 is heated. As a result, deterioration such as yellowing tends to occur in the lens main body 43. However, the relief section 49 for preventing the lens main body 43 of the lens 14 from coming into contact with the surface light source 34 is formed in the lens main body 43. Therefore, it is possible to reduce the deterioration of the lens main body 43 that controls the light of the surface light source 34.

The attachment legs 44 of the lens 14 come into contact with the substrate 33 on which the surface light source 34 is mounted. Therefore, the attachment legs 44 tend to be affected by heat. However, since the attachment legs 44 are unrelated to the control of the light, no problem occurs even if the attachment legs 44 are yellowed. The yellowing of the attachment legs 44 affects the lens main body 43 little.

In the bulb-type lamp 11 in this embodiment, the interval of one place among the intervals among the adjacent bosses 25 of the base body 12 is provided wider than the intervals of the other places. The lighting circuit board 77 of the lighting circuit 18 is provided longitudinally along the lamp axis direction on the inner side of the base body 12. The lighting circuit components 78 mounted on the lighting circuit board 77 is arranged with the one surface of the lighting circuit board 77 opposed to a portion between the boss sections 25 having the wide interval of the base body 12. Therefore, it is possible to reduce the diameter of the base body 12 while enabling the screwing of the light source unit 12 in the base body 12 and the arrangement of the lighting circuit 18 in the base body 12.

Further, the boss sections 25 projected from the inner surface of the base body 12 to screw the light source unit 13 and the hollow sections 63 on the outer surface of the cover 16 fit with each other. Therefore, it is possible surely stop the rotation of the base body 12 and the cover 16 without using special whirl-stop means.

Further, the thickness of the base body section 20 of the base body 12 is formed smaller than the thickness necessary for the screwing of the light source unit 13, i.e., smaller than the diameter dimension of the boss sections 25 that form the attachment holes 27. Therefore, even if the base body 12 is reduced in diameter, it is possible to secure a space for arranging the lighting circuit 18 in the base body 12.

Further, the lighting circuit board 77 is arranged in the position offset from the centers of the base body 12 and the cover 16 such that the distance between the mounting surface, which is the one surface of the lighting circuit board 77, and the inner surface of the base body 12 and the cover 16 is larger than the distance between the wiring pattern surface, which is the other surface, and the inner surface of the base body 12 and the cover 16. Therefore, it is possible to efficiently store and arrange the lighting circuit board 77 in the base body 12 and the cover 16 and reduce the diameters of the base body 12 and the cover 16.

The bulb-type lamp 11 configured as explained above can be formed in a shape close to the shape of the mini krypton bulb and can be adapted to the luminaire 81.

The light source unit 13 does not have to include the radiator plate 32 as long as the light source unit 13 includes the substrate 33. When the light source unit 13 does not include the radiator plate 32, the claw sections 52 of the attachment legs 44 of the lens 14 only have to be configured to be locked to the other surface of the substrate 33.

The lens 14 in this embodiment can be applied to a bulb-type lamp in which an E26-type cap is used.

The lens 14 in this embodiment can be applied to, besides the bulb-type lamp, various lighting devices in which a semiconductor light-emitting element is used as a light source, such as a flat-type lighting device in which a GX53-type cap is used.

In the lens 14 in this embodiment, the shape of the first and second recesses 45 and 47 may be elliptical, parabolic, or other rotational quadric surfaces besides the partially spheroidal surface. In other words, all the first and second recesses 45 and 47 can be considered to have the partially spheroidal shape.

While several embodiments have been described, these embodiments have been presented by way of example only, and are not intended to limit the scope of the inventions. These novel embodiments may be embodied in a variety of other forms. Various omissions, substitutions, and changes in the form of the embodiments described herein may be made without departing from the spirit of the inventions. These embodiments and the modifications thereof are included in the scope and the spirit of the inventions and included in the inventions described in patent claims and the scope of equivalents of the inventions.

REFERENCE SIGNS LIST 11 bulb-type lamp functioning as a lighting device
12 base body
14 lens
15 globe
16 cover
17 cap
18 lighting circuit
20 base body section
25 boss sections
34 surface light source functioning as a light source
45 first recess
46 first lens section
47 second recess
48 second lens section
50 continuous section
61 cover main body
63 hollow sections
77 lighting circuit board
78 lighting circuit components
81 luminaire
82 luminaire main body
83 socket

The invention claimed is:

1. A bulb-type lamp comprising:
a base body;
a light source having a semiconductor light-emitting element and arranged to one side of the base body;
a lens including:
a first lens section including a first recess opened toward the light source, wherein a thickness of a part of the first lens section increases at portions that are farther from the light source, and
a second lens section formed integrally with the first lens section and including a second recess opened away from the light source, wherein a radius of the second recess is formed larger than a radius of the first recess and a thickness of a part of the second lens section decreases at portions that are farther from the light source;
a globe having an open end, an outer diameter dimension of the open end being larger than an outer diameter dimension of the base body, and being attached to one end side of the base body to cover the light source and the lens;
a cap provided on the other end side of the base body; and
a lighting circuit housed between the base body and the cap.

2. The bulb-type lamp according to claim 1, wherein the outer surface of the first lens section and the outer surface of the second lens section are formed as generally hemispherical shell shapes or partially spheroidal surfaces.

3. The bulb-type lamp according to claim 1, wherein the lens further includes a continuous section that allows an outer surface of the first lens section and an outer surface of the second lens section to be continuous.

4. The bulb-type lamp according to claim 3, wherein the continuous section is formed in a non-acute angle shape.

5. The bulb-type lamp according to claim 4, wherein the continuous section has a cylindrical shape.

6. The bulb-type lamp according to claim 1, wherein
the base body includes a cylindrical base body section and a plurality of boss sections projecting from an inner surface of the base body section and provided spaced apart in a circumferential direction to mount the light source, an interval in one place among intervals of the boss sections adjacent to one another is provided wider than intervals in other places, and
the lighting circuit includes a lighting circuit board and a lighting circuit component mounted on one surface of the lighting circuit board and is arranged longitudinally along a lamp axis direction on an inner side of the base body, the lighting circuit component being arranged with the one surface of the lighting circuit board being opposed to a portion between boss sections having the wide interval of the base body.

7. The bulb-type lamp according to claim 1, comprising a cover, wherein
the base body includes a cylindrical base body section and a boss section provided to project from an inner surface of the base body section to mount the light source, and
the cover includes a cylindrical cover main body arranged along the inner surface of the base body and includes, on an outer surface of the cover main body, a hollow recessed section in which the boss section fits.

8. A luminaire comprising:
a luminaire main body including a socket; and
the bulb-type lamp according to claim 1 attached to the socket.

* * * * *